June 8, 1965 M. T. FARQUHAR ETAL 3,187,981
SEPARATOR CELL FOR FRAGILE ARTICLES AND PACKAGE
INCORPORATING THE SAME
Filed July 11, 1962 2 Sheets-Sheet 1
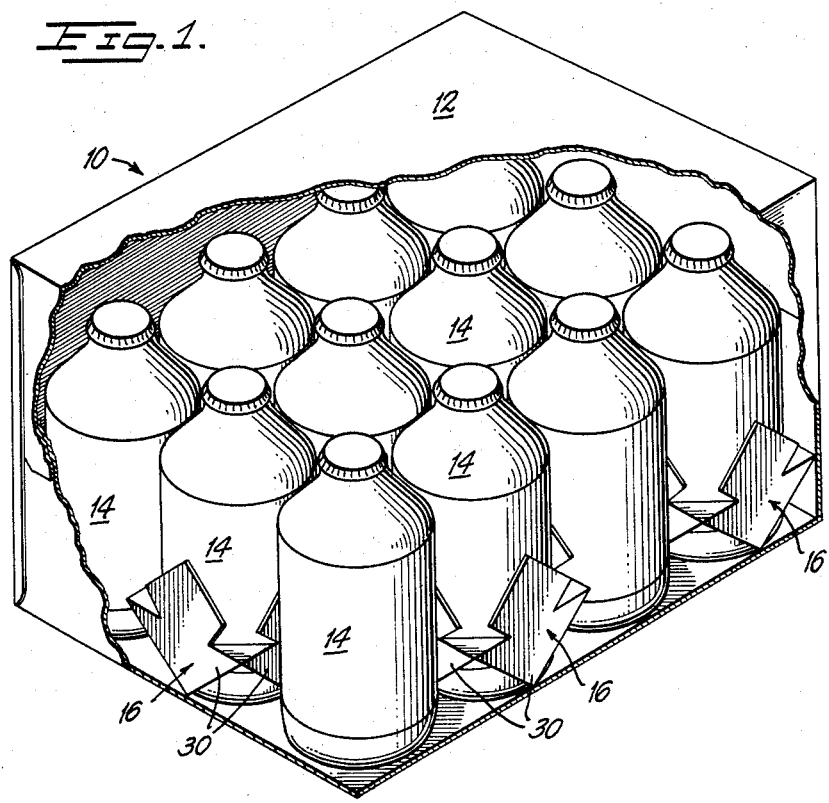
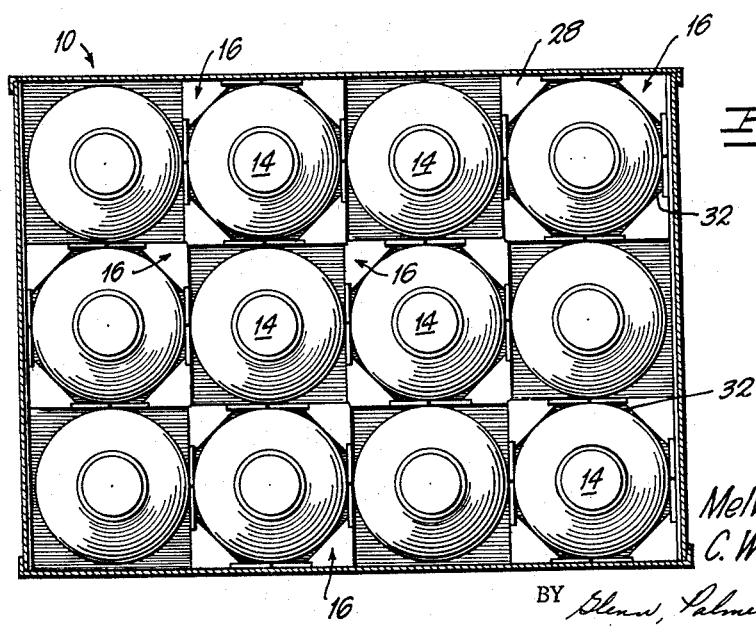
INVENTORS
Melville T. Farquhar &
C. Warren Calhoun, Jr.
BY
ATTORNEY INVENTORS
Melville T. Farquhar &
C. Warren Calhoun, Jr.
BY
ATTORNEY

United States Patent Office 3,187,981
Patented June 8, 1965

3,187,981
SEPARATOR CELL FOR FRAGILE ARTICLES AND PACKAGE INCORPORATING THE SAME
Melville T. Farquhar, Bon Air, and Clinton Warren Calhoun, Jr., Henrico County, Va., assignors to Reynolds Metals Company, Richmond, Va., a corporation of Delaware
Filed July 11, 1962, Ser. No. 209,009
8 Claims. (Cl. 229—42)

This invention relates to a novel separator cell for use in cartoning frangible articles and also to a package incorporating a plurality of the separator cells in a novel manner.

More particularly, the present invention relates to a separator cell for glass or other fragile articles which can be inexpensively manufactured on a mass production basis from sheet material, such as cardboard, by simple cutting and scoring techniques, without requiring additional more complex and expensive fabrication steps such as interdigitation of tabs, notches, or a number of separate elements, as is commonly the case with existing types of carton separator cells or partitions.

Further, the present invention contemplates associating the individual cells with the articles to be protected in a novel and efficient package arrangement whereby costs are minimized, as well as providing positive separation of each fragile article from the adjacent fragile articles to prevent breakage or other damage thereto.

A further significant feature of the instant separator cell resides in the ease with which the cell may be associated with the article to be protected, and in this regard the present separator cell lends itself to high-speed modern packaging and casing techniques.

Another chief object of the instant separator cell resides in its utter simplicity as compared to other separator or partition devices, yet without sacrificing in the least any of the objects, advantages and improved results as above set forth.

Other objects and advantages of the present invention will become apparent from the following detailed description taken in connection with the accompanying drawings, in which:

FIG. 1 is a perspective view of the novel packaging arrangement for fragile articles utilizing the instant separator cell, a portion of the carton side wall being broken away.

FIG. 2 is a top plan of the novel package, with the carton top panel removed.

Figure 3:
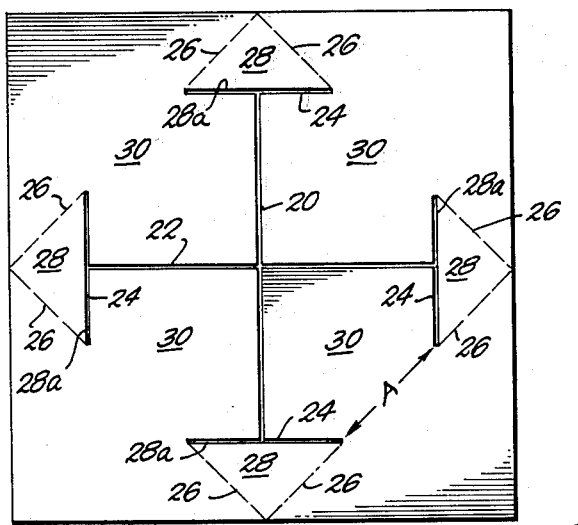
FIG. 3 is a top plan view of the separator cell blank.

Referring to the drawings, the instant package 10, FIG. 1, comprises a carton or case 12 of cardboard or the like within which is packaged a plurality of fragile articles 14, such as a plurality of glass bottles or other glassware. Each individual glass article 14 is separated from and out of contact with each adjacent glass article by means of a plurality of separator cells 16. As best seen in FIG. 2, the separator cells 16 are disposed about alternate bottles 14 in staggered relation. In the illustrated package of twelves articles 14, there are one half as many separator cells 16. Any even numbered rectangular array of bottles will likewise require half as many separator cells. Similarly, in an odd-numbered rectangular array of articles, such as a nine-bottle pattern formed by the three left-hand three-bottle rows in FIG. 2, there are required a number of cells equal to one-half the number of articles less one, or four cells, i.e. ½(9−1). Alternatively, any odd-bottle rectangular array may be packaged with an additional separator cell 16, such as exemplified by the nine-bottle pattern formed by the three right-hand rows in FIG. 2. In such case, five cells will be employed according to the general rule that the number of cells can equal one-half of a number equal to one more than the total number of articles, i.e. ½(9+1). The latter arrangement is slightly less economic in mass-production packaging, in thus requiring one added cell for any given odd-numbered array.

Figure 4:
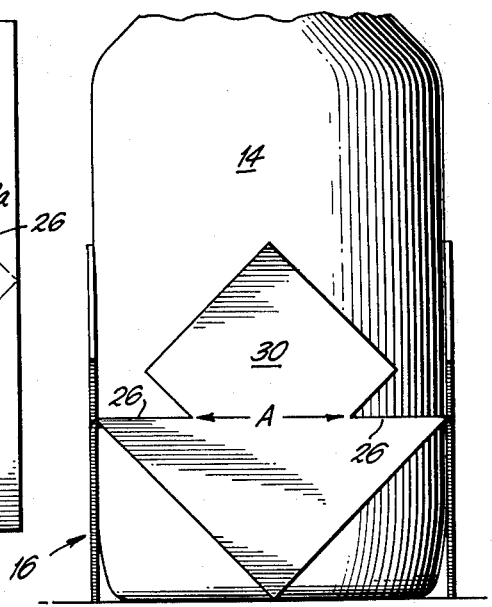
FIG. 4 is a side elevation of the separator cell as associated with a fragile article.
Figure 5:
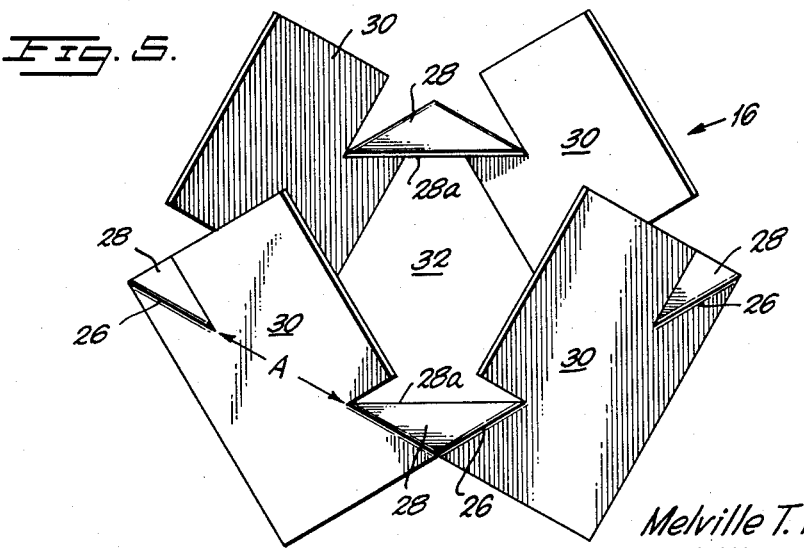
FIG. 5 is a perspective view illustrating the erect separator cell as it would appear absent the article with which it is associated.

Referring more particularly to FIGS. 3, 4 and 5 each separator cell 16 is preferably formed from an individual square blank or sheet of cardboard or similar heavy paper stock. The blank 18 is formed with a pair of slits 20, 22 which intersect at right angles centrally of the blank 18. The slits 20, 22 are respectively parallel to the opposite edges of the square blank 18.

Each slit 20, 22 terminates a uniform distance from the adjacent marginal edge of the blank, at which termini a plurality of shorter perpendicular slits 24 are provided, each slit 24 extending equally on opposite sides of the adjacent slit 20 or 22. The arrangement of the several slits 20, 22 and 24 thus partake in appearance of a Potent Cross. The blank 18 is further provided with score lines 26 extending between each end of the slits 24 toward the center of the adjacent side edge of the blank, thereby defining with the slits 24 a plurality of triangular areas 28.

As the slits 20, 22 intersect centrally of the blank 18 and are parallel to the side edges thereof respectively, and the score lines 26 respectively bounding each tab 28 intersect centrally of the blank edge, it will be seen that the adjacent score lines 26 of adjacent triangular portions 28 lie on a common line, whereby each of the four panel members 30 defined by adjacent slits 20, 22 and 24, 24 adjacent fold lines 26, 26, and the right-angled edge of the blank 18 may be folded about the score or hinge lines 26 to form an upstanding panel or wall 30, as seen in FIGS. 4 and 5.

With each of the panels 30 folded at right angles with respect to the triangular areas 28, the separator cell 16 thus forms a polygonal annulus having a square periphery and an eight-sided internal opening 32, as best seen in FIG. 2. Preferably, the internal opening 32 defined by the portions A, FIG. 3, of the four side walls 30 and the inner edges 28a of the triangular portions 28, is octagonal, i.e., having eight sides of effectively equal length. The effective internal faces of panels 30 at A, however, may readily be either greater or less than the length of the inner edges 28a of triangular portions 28, depending upon the service required or article 14 to be protected.

The separator cell 16 thus described is readily slipped over a fragile container 14 as seen in FIG. 4 to thereby surround and embrace the same. If the internal periphery of the opening 32 is octagonal, with the edges 28a and the portions A of the panel 30 extending between adjacent edges 28a of equal length, a cylindrical container 14 as illustrated will tangentially engage the separator cell at eight equally spaced points circumferentially thereof, namely centrally of each edge 28a and centrally of the panels 30 between adjacent edges 28a.

If, however, it is desired to have engagement with a cylindrical container at only four points, then the blank 18, FIG. 3, may be formed with the slits 24 of greater or lesser length, whereby the resulting edges 28a of the triangular portions 28 will be either greater or lesser respectively in length than the portions A of the panell 30. If the edges 28a of corner portions 28 are greater than the distance A on panel 30, then the inner face of each of the four vertical panels 30 will be in tangential contact with a cylindrical fragile article 14, while if the width of panel 30 at A is less than the edge 28a, then the several horizontal edges 28a will be in tangential contact with the article 14, the panels 30 being radially spaced therefrom.

It will be seen that the shorter the slits 24 are, the longer the portions A of panel 30 will become, and accordingly the maximum width of the central opening 32 will be reduced. On the other hand, if the slits 24 are equal or greater in length than the portion A, the maximum width of the opening is determined by the distance between a pair of opposing edges 28a, which latter in turn is a function of the amount of inward spacing of the slits 24 from the edge of the blank 18.

Accordingly, it will be seen that the novel separator cell 16 as set forth can be readily manufactured to accommodate varying article or container sizes by the simple expedient of adjusting either (1) the length of the slits 24 or (2) the inward spacing of the slits 24 from the edge of the blank. Regardless of the dimensions employed, it will be seen any such blank having the slit and fold line relationships of the blank 18 will resemble the folded cell seen in FIG. 5 and partake of all the advantages and desirable attributes thereof.

As above stated, the instant separator cell 16 completely surrounds the article 14. This feature of the separator cell permits a multiplicity of the same to be associated with a number of articles 14 to form the novel package 10 of FIGS. 1 and 2. As each cell completely surrounds its associated article 14, it is unnecessary to provide an individual separator for each article within the carton 12. Rather, a cell 16 can be associated with every other article 14, the cells being disposed in staggered array in the respective transverse lines and files of the article group, as seen in FIG. 2. In this manner, there is provided a panel 30 between every adjacent article 14, although there are only one half as many separator cells as there are articles. This condition obtains only when the portion A of panel 30 is at least equal to or greater in length than the edge portion 28a, in which event the articles 14 engage the panels 30, whereby the latter are sandwiched between adjacent articles to insulate and cushion the same, preventing damage thereto.

When however the slits 24 or edges 28a are greater in length than the panel portion A, wherein the articles are tangentially engaged against the horizontal corner portions 28 rather than the side panels 30, it becomes necessary to employ a separator cell for each individual article in the carton, as otherwise the articles lacking separator cells 16 would be relatively loose within the carton and accordingly subject to damage.

A further important advantage obtains from the construction of the novel separator cell 16 disclosed when the same is employed with containers having necked or domed upper ends, such as the containers 14 illustrated. It will be apparent that when the blank 18, FIG. 3, is lowered centrally over and in line with a necked container 14, with the blank held by the fingers at its edges or by other gripping means, the top of the article 14 engaging the blank 18 at the juncture of the slits 20, 22 will effect pivoting of the panels 30 about the score lines 26 as the blank is lowered about the bottle, whereby the separator cell 16 becomes self erecting to the position of FIG. 4. Accordingly important economic and handling advantages are realized utilizing the instant separator cell 16 in the automatic packing or casing of articles, as suitable supply hopper dispensing means of the magazine type can be provided in the casing machinery supply line, which will automatically dispense a blank 18 for each alternate bottle or container 14, the dispensing means drawing the blank 18 down about the article 14 to thereby erect the same as shown and above discussed. Thus, the containers 14, as they are grouped for insertion into a case by conventional handling machinery, will have the separator cells already positioned thereon, whereby when the same are assembled and sealed into the case, the containers will be spaced and insulated from one another automatically without requiring further handling. The results thus achieved by the separator cell 16 of the instant invention are in marked contrast to present casing techniques, wherein a more expensive carton must be provided having separator or partition means built thereinto at greater cost, or, as is often the case, the divider or separator means must be supplied to the grouped articles after the same have been inserted into the case. This latter technique is slow and cumbersome as it is quite difficult to insert spacer means automatically when the articles have been already grouped, or are within the rather close confines of a carton or case. Such is the method employed with the conventional tic-tac-toe or checkerboard interlocked spacer or divider means widely employed at present.

While the separator cells 16 are preferably formed from cardboard or like material which permits the diecut blank 18 to be formed and erected in proper position upon the article 14 as above described, the separator cell 16 may be supplied in fully erected position, as seen in FIG. 5, and to this end may be formed from substantially rigid plastic material, whereby the same may be readily deposited over advancing containers in a casing machinery line. If the separator cells 16 are supplied in fully erected condition, use of the same is facilitated with containers which are substantially cylindrical, such as baby food jars, and which do not have a tapering or narrow neck portion.

Regardless of whether the separator cells are erected from the blank form in the act of positioning the same upon the containers 14, or are supplied in fully erect substantially rigid form, it will be seen that the resultant package 10 thereof partakes of the same advantages and array, as a result of which all containers within the package 10 are spaced from one another and protected from shipping damage or other jarring during handling thereof which might injure the fragile or glasslike articles packaged.

The triangular corner portions 28 perform an important function in connection with the instant separator cell 13. While the panels 30 are disposed in a square pattern as viewed from the top thereof when the cell is erected, the corner triangular portions 28 are at right angles thereto or lie in a common horizontal plane. As a result of the disclosed association between the vertical panels 30 and the horizontal corner portions 28, the resultant separator cell 16 is quite rigid, wherein the triangular portions 28 acting as gussets prevent any tendency of the erected cell 16 to shift laterally to a rhombus-like shape. Further, when the edges 28a of the corner portions 28 engage the articles 14 therewithin, the engagement of a horizontal portion 28 with the side wall of the container results in greater structural rigidity and minimizes any tendency of the cell to bow outwardly or distort. This feature is especially advantageous when the opening 32 within the cell 16 is uniformly octagonal, whereby it is only necessary to employ cells 16 for alternate articles 14 in the case 10, and at the same time the articles are in tangential contact with the four triangular tab portions 28 as well as the panels 30, thereby providing a rigid and safe partition or cell structure for the casing of fragile articles.

It is thought that the invention and many of its attendant advantages will be understood from the foregoing description, and it will be apparent that various changes may be made in the form, construction and arrangement of the parts without departing from the spirit and scope of the invention or sacrificing all of its material advantages.

What is claimed is:

1. A blank for an erectable separator cell comprising, a square sheet of substantially rigid foldable material, said sheet having a pair of primary slits crossing at right angles centrally thereof and each terminating at points uniformly inwardly of the marginal edges of said sheet, said sheet having a short slit parallel to each sheet marginal edge intersecting the ends of each primary slit and extending a uniform distance on each side thereof, and score lines on said sheet converging from each end of each said short slit and extending to the center of each sheet marginal edge to thereby dispose adjacent score lines of adjacent short slits on a common straight line, whereby said sheet may be folded along the score lines of each common straight line to erect four wall panels and define a central polygonal opening.

2. The blank of claim 1 wherein each said short slit is equal in length to said sheet along said common line between said adjacent score lines thereof, to thereby define a regular octagonal central opening in said cell when said sheet is erected.

3. The blank of claim 1 wherein each said short slit is greater in length than said sheet along said common line between said adjacent score lines thereof, to thereby define an octagonal central opening in said cell when said sheet is erected of lesser width between opposite longer edges of said short slits than between opposite sheet portions along said common line.

4. The blank of claim 1 wherein each said short slit is lesser in length than said sheet along said common line between said adjacent score lines thereof, to thereby define an octagonal central opening in said cell when erected of lesser width between opposite sheet portions along said common line than between opposite longer edges of said short slits.

5. A separator cell for a fragile article comprising an annulus formed from sheet material for surrounding the article, said annulus including four vertically disposed substantially square planar panels with a pair of diagonally opposite corners of each panel in respective point contact with an adjacent panel disposed at right angles thereto, a horizontal tab of right-triangular configuration disposed at each corner juncture of two said panels and integrally associated therewith along the right-angular legs thereof to rigidify said annulus and resist rhombus-like deformation thereof by force exerted perpendicular to said panels.

6. The separator cell of claim 5 wherein the hypotenuse leg of each triangular tab is equal in length to the portion of each said panel between adjacent tabs whereby the inner periphery of said annulus defines a regular octagon, to thereby provide tangential protective engagement with an embraced cylindrical article at eight circumferentially spaced points.

7. The separator cell of claim 5 wherein the hypotenuse leg of each triangular tab is greater in length than the portion of each said panel between adjacent tabs to dispose opposite tab hypotenuse legs in more closely spaced relation than are opposed panels whereby the hypotenuse legs of said horizontal tabs engage and cushion an embraced article in addition to rigidifying said cell.

8. The separator cell of claim 5 wherein the hypotenuse leg of each triangular tab is lesser in length than the portion of each said panel between adjacent tabs to dispose opposed panels in more closely spaced relation than opposed tab hypotenuse legs.

References Cited by the Examiner
UNITED STATES PATENTS

| 1,039,026 | 9/12 | Carter. | |
| 1,282,656 | 10/18 | Tiede | 229—39 |
| 1,890,942 | 12/32 | Goodman | 229—89 |
| 2,667,267 | 1/54 | Amatel. | |

GEORGE O. RALSTON, *Primary Examiner*.